United States Patent
Ross et al.

(10) Patent No.: US 6,272,417 B1
(45) Date of Patent: Aug. 7, 2001

(54) VEHICLE BRAKING SYSTEM

(75) Inventors: Colin F. Ross, Worcs; Dudley J. Harrison, Birmingham, both of (GB)

(73) Assignee: Haldex Brake Products Limited (GB)

( * ) Notice: Subject to any disclaimer, the term of this patent is extended or adjusted under 35 U.S.C. 154(b) by 0 days.

(21) Appl. No.: 09/381,183

(22) PCT Filed: Mar. 16, 1998

(86) PCT No.: PCT/GB98/00779

§ 371 Date: Feb. 4, 2000

§ 102(e) Date: Feb. 4, 2000

(87) PCT Pub. No.: WO98/41429

PCT Pub. Date: Sep. 24, 1998

(30) Foreign Application Priority Data

Mar. 15, 1997 (GB) .................................................. 9705445

(51) Int. Cl.⁷ .................................. B60T 7/12; B60T 8/32
(52) U.S. Cl. ............................... 701/71; 701/70; 701/73; 701/80; 303/121; 303/122.06; 303/122.09; 477/182
(58) Field of Search ................................ 701/70, 71, 73, 701/74, 78, 79, 80, 83; 303/121, 122.06, 122.09; 477/182

(56) References Cited

U.S. PATENT DOCUMENTS

| | | |
|---|---|---|
| 3,944,291 | 3/1976 | Lindemann et al. ............... 303/21 A |
| 4,320,459 | 3/1982 | Lindemann et al. ................. 364/426 |
| 4,825,371 | 4/1989 | Hoashi et al. ................... 364/426.02 |
| 5,375,918 | 12/1994 | Kuwana et al. ..................... 303/110 |
| 5,452,947 | 9/1995 | Ehmer et al. ........................ 303/150 |

FOREIGN PATENT DOCUMENTS

| | | |
|---|---|---|
| 2349681A | 4/1975 | (DE) . |
| 2830580A1 | 2/1980 | (DE) . |
| 3709157A1 | 10/1987 | (DE) . |
| 19545012A1 | 6/1997 | (DE) . |
| WO9220555A | 11/1992 | (WO) . |
| WO97/20718 | 6/1997 | (WO) . |

*Primary Examiner*—William A. Cuchlinski, Jr.
*Assistant Examiner*—Yonel Beaulieu
(74) *Attorney, Agent, or Firm*—Leydig, Voit & Mayer, Ltd.; John M. Augustyn

(57) ABSTRACT

A vehicle braking system including a controller, in an initial anti-skid cycle, performs a first determination to select a high or a low control mode in accordance with wheel speed parameters. The controller in a second, or subsequent anti-skid cycle, performs a second determination to determine whether a near $\mu$ test is to be performed in accordance with wheel speed parameters. The controller consequent upon selection of low control mode performs a near $\mu$ test. The near $\mu$ test includes performing a rise in the brake pressure and then selecting a high or low mode in accordance with the speed of the wheels resulting from the rise in brake pressure in the near $\mu$ test.

24 Claims, 11 Drawing Sheets

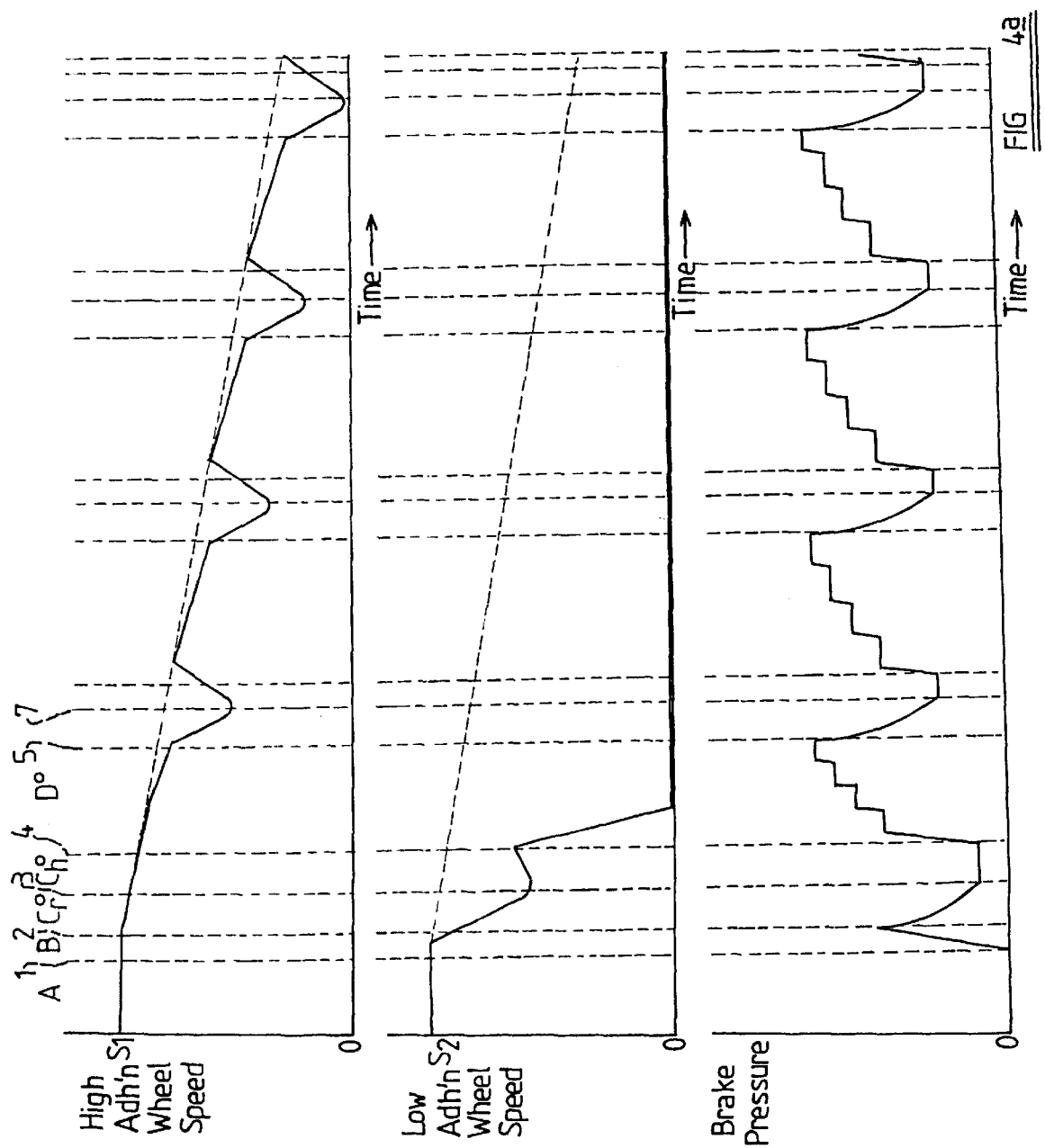

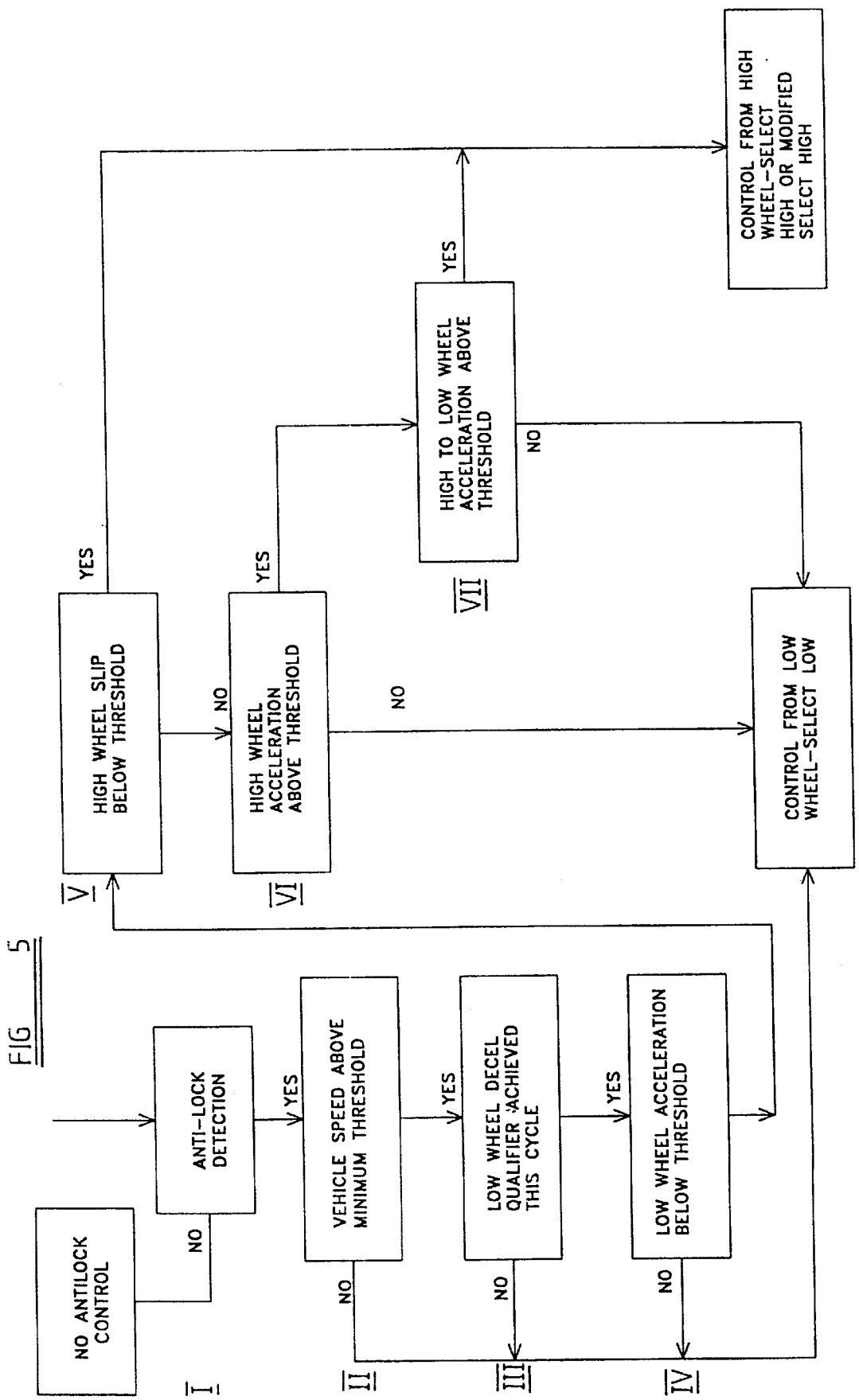

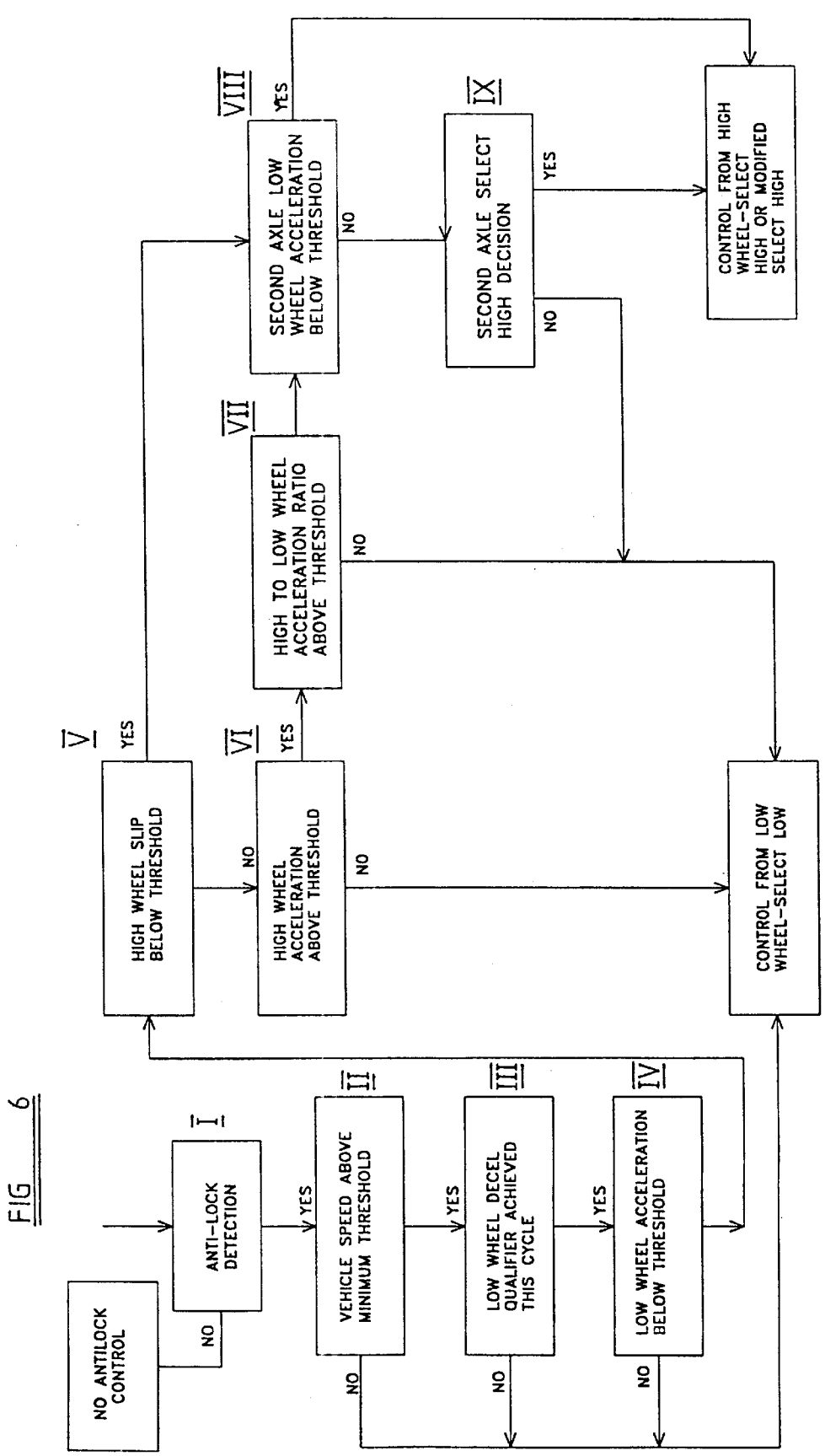

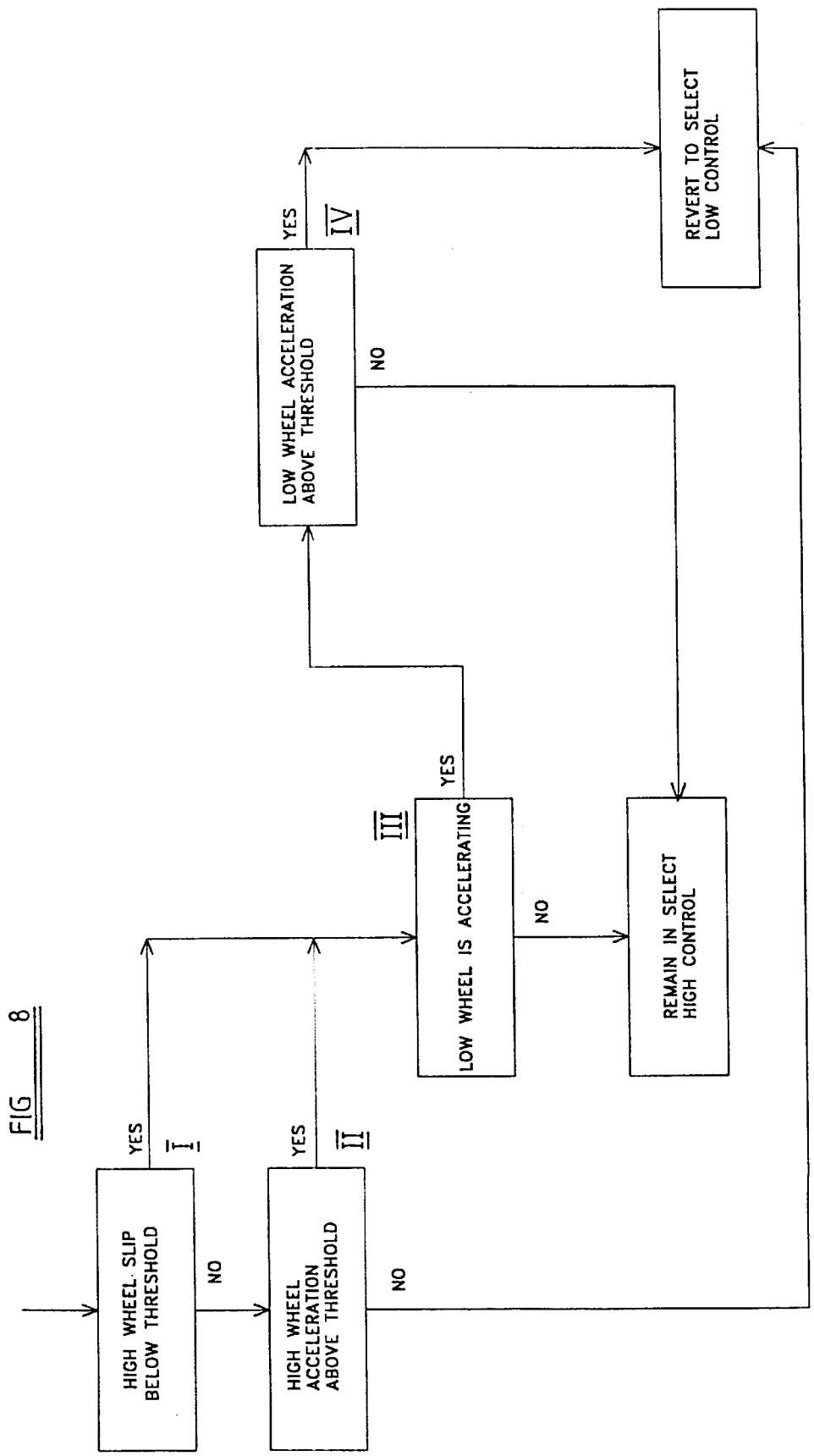

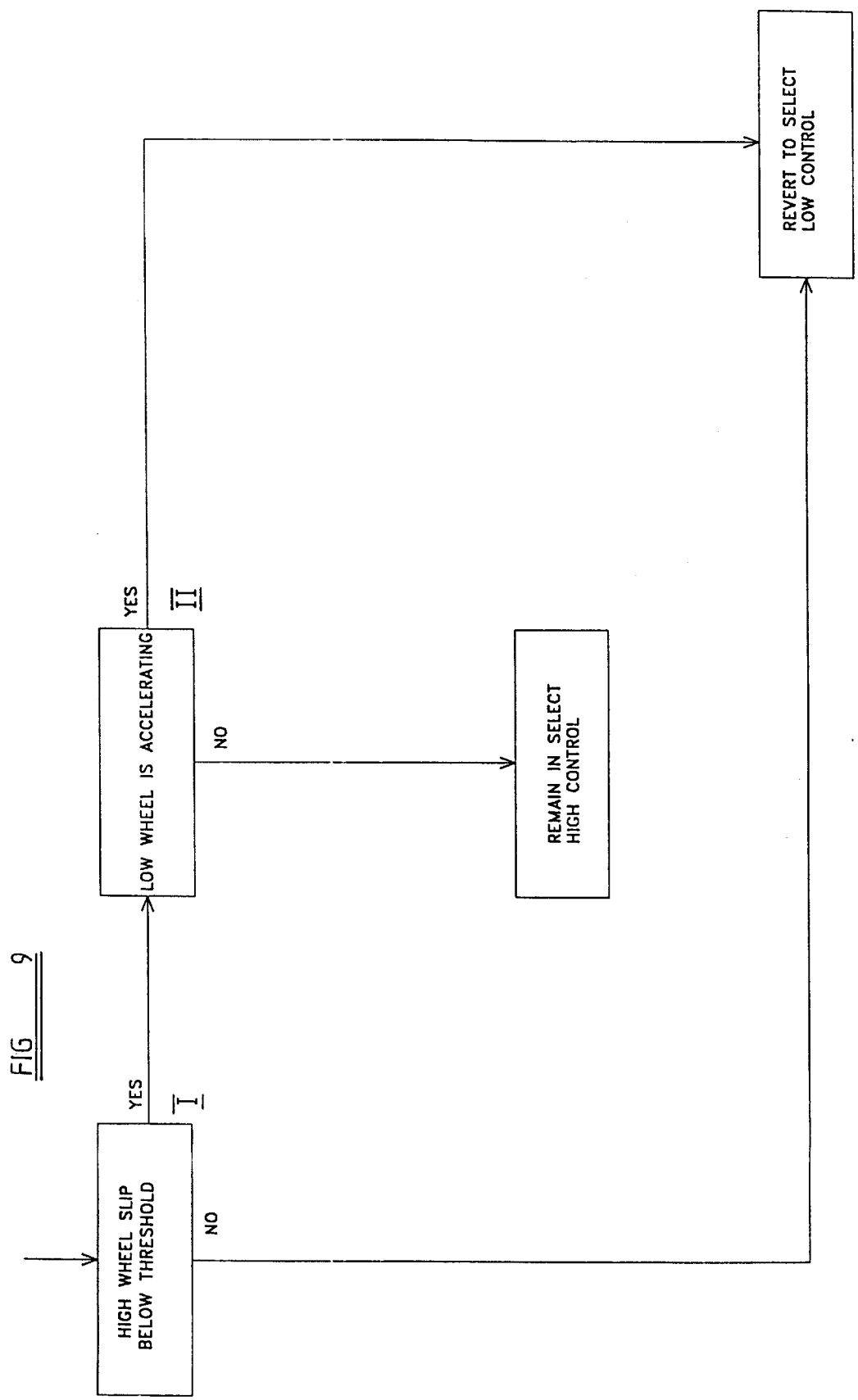

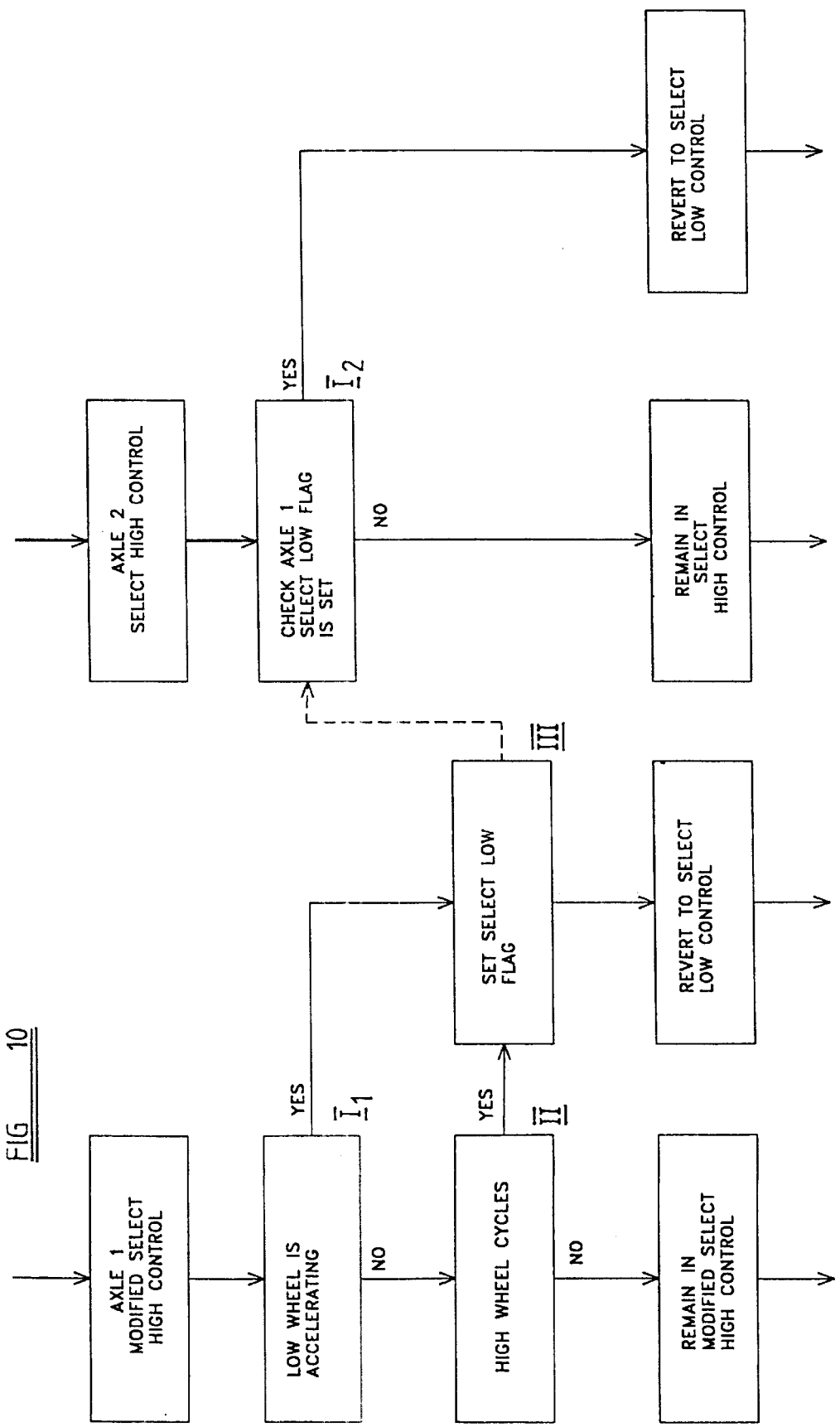

VEHICLE BRAKING SYSTEM

FIELD OF THE INVENTION

This invention relates to a vehicle braking system having at least two wheels which are braked by fluid brake pressure. The braking system may comprise at least one brake control channel. The or each brakes channel may comprise a controller responsive to wheel skid signals from at least two wheel speed sensors, for sensing speed conditions of at least two wheels and for generating skid control instructions, a plurality of wheel brakes responsive to fluid brake pressure, supplied thereto, a supply means, comprising a common supply valve, for supplying brake pressure to said brakes from a fluid pressure supply in accordance with a brake operating signal and a skid control means controlled by said skid control instructions for controlling the brake pressure in a plurality of cycles each of which comprises a pressure reduction phase and a pressure increase phase and may also comprise a pressure hold phase between the pressure reduction and increase phases.

For example, the or each channel may comprise two wheels at opposite ends of a common axle or may comprise two wheels at the same end of different axles. The wheels may be of any type, e.g. driven, steered or load carrying.

When a "split co-efficient of friction situation" arises, i.e. when one wheel of a channel is engaged with a surface having a co-efficient of friction which is higher (higher friction surface) than the co-efficient of friction of a surface with which another wheel is engaged (lower friction surface), it has been known to select one of the wheels as the wheel which controls the operation of the skid control means. If the wheel engaged with the or a lower friction surface is selected (known as "low mode") then, when the brakes are applied, the skid control means is operated, in dependence on the controller detecting a skid condition of the wheel engaged with the lower friction surface, to cause the common supply valve to control brake pressure to reduce the braking effect on all the wheels of the channel. Where the channel comprises more than two wheels normally the skid control means is controlled by the wheel engaged with the lowest friction surface, i.e. the first wheel to skid. However, if desired, any surface other than the highest friction surface may be selected if desired and such surface is referred to herein as the lower friction surface.

In a low mode the controller controls the brake pressure of the wheels in accordance with skid conditions of the wheel engaged with the lower friction surface. This causes a reduction in the braking effect of the wheel(s) engaged with the or each higher friction surface so that overall braking effect is reduced and the retardation is approximately equivalent to the wheels being engaged with the lower friction surface.

Alternatively, if the wheel engaged with a higher friction surface is selected (known as "high mode"), then when the brakes are applied the skid control means is operated in dependence on the controller detecting a skid condition of the wheel engaged with the higher friction surface, to cause the common supply valve to control brake pressure to reduce the braking effect of the wheels.

When the channel comprises more than two wheels normally tie skid control means is controlled by the wheel engaged with the highest friction surface, i.e. when all the wheels have skidded. However, if desired, any surface other than the highest friction surface may be selected if desired and such surface is referred to herein as the higher friction surface.

In a high mode the controller controls the brake pressure of the wheels in accordance with skid conditions of the wheel engaged with the higher friction surface. This causes the wheel(s) on the or each lower friction surface to continue to skid. In these circumstances, the wheel(s) engaged with the or each lower friction surface provides little stability, although by providing skid control to the wheel(s) engaged with the higher friction surface(s) retardation is maximised from the wheel(s) engaged with the higher friction surface(s) and overall stability is maintained.

A control system which is able to change from a select low mode to a high mode depending upon prevailing surface conditions would have the benefits of low mode on homogeneous low and narrow split friction surfaces and the benefit of high mode on wider split friction surfaces.

The principal of changing control mode requires a plurality of problems to be overcome. For example, at least one of:

the ability to recognise different road surface friction;

the ability to establish a relationship between the reaction of a wheel of the vehicle to low friction and high friction surfaces;

provision of adequate brake pressure, which is load and road surface dependant, available at the brake to enable the adhesion to be utilised before changing logic;

the effect of load on wheel reaction, the ability to react to changes in driver demand during a stop.

The ability to react to changes in road surface, for example, homogeneous to split friction and split friction to homogeneous friction during a stop.

The only information available to make the above decisions is wheel speed of which there are three parameters that can be utilised, namely:

rate of wheel deceleration rate of wheel acceleration speed differences between an actual wheel speed and a notional wheel speed if there were no wheel slip relative to the road i.e. equivalent to vehicle speed.

An object of the invention is to provide a new and improved vehicle braking system whereby the above mentioned problems are overcome or reduced.

According to one aspect of the present invention we provide vehicle braking system comprising;

means, in an initial anti-skid cycle, to perform a first determination to select a high or a low control mode in accordance with wheel speed parameters;

means in a second, or subsequent anti-skid cycle, to perform a second determination to determine whether a near $\mu$ test is to be performed in accordance with wheel speed parameters, means, consequent upon selection of low control mode to perform the near $\mu$ test comprising performing a rise in the brake pressure and then selecting a high or low mode in accordance with the speed of the wheels resulting from said rise in brake pressure in the near $\mu$ test.

Said rise in brake pressure may be a controlled rise.

Said selection of mode as a result of the near $\mu$ test may comprise performing said first determination.

Said selection of mode may be performed in the first cycle following the near test and said second determination may be performed in a following cycle or cycles.

In said first determination at least one of the following steps may be performed;

determine which wheel first achieves a pre-determined detection threshold, and nominate it the low wheel, determine the deceleration of low wheel, determine the acceleration of low wheel, determine the slip of the other, high, wheel, determine the acceleration of the other, high, wheel, determine the ratio of accelerations of said low and high wheel and select a high/modified select high or a low control mode in accordance therewith.

Where said first determination results in a low mode, in a subsequent anti-skid cycle, said second determination may be performed.

In said second determination the following steps may be performed;

ascertain whether slip of said high wheel is below a threshold, determine the slip of the low wheel, determine the acceleration of the low wheel, determine the acceleration of the high wheel, determine the ratio of accelerations of the low and high wheels, determine whether or not a near $\mu$ test is to be performed in accordance therewith.

In an anti-skid cycle in which brake pressure in increased in steps by means comprising a solenoid which is intermittently de-energized the system may comprise means to, determine a time $T_1$ for which the solenoid is de-energised in a first step of the anti-skid cycle, and means to perform said near $\mu$ test by de-energising said solenoid for a time $T=T_1+T_c$, where Tc is a constant.

Alternatively in an anti-skid cycle in which brake pressure in increased in steps by means comprising a solenoid which is intermittently de-energized the system may comprise means to, determine the total time $T_T$ for which the solenoid is de-energised, in a first step of the anti-skid cycle and all subsequent steps, and multiply this by a function to give the time T.

Said first determination may comprise at least one of means to ascertain which wheel first achieves a pre-determined determination threshold and nominate it the low friction wheel, determine whether the low wheel has a deceleration which is above a predetermined threshold, if no, select low mode; if yes, proceed to determine whether the low wheel has an acceleration which is below a predetermined threshold, if no, select low mode; if yes proceed to determine whether the other, high wheel has a slip below a pre-determined threshold;

a) if yes; (and the system has a single axle), select high; or, b) if yes (and the system has a second axle) proceed to determine whether the low wheel of the second axle has an acceleration below a pre-determined threshold, if yes, high mode or modified select high; if no, proceed to a select high decision on said second axle, if no; select low mode; if yes, select high or modified select high, c) if no (and the system has a single axle or a second axle), proceed to determine whether, the high wheel has an acceleration above a pre determined threshold, if no, select low; if yes, proceed to determine whether the ratio of acceleration of the high to the low wheel is above a pre-determined threshold, $c_1$) if no, select low, if yes (and the system has a single axle) high or modified select high mode; or $c_2$) if yes (and the system has a second axle) proceed to determine whether the low friction wheel of the second axle has an acceleration below a pre-determined threshold, if yes, select high or modified high; if no, proceed to effect a select high decision on a said second axle, if no, select low; if yes, select high or modified high mode.

A select high decision on said second axle may comprise at least one of means to ascertain which wheel first achieves a pre-determined detection threshold then nominate it the low wheel, determine whether the low wheel has deceleration which is above a predetermined threshold, if no, select low; if yes, proceed to determine whether the low wheel has an acceleration which is below a pre determined threshold, if no, select low; if yes, proceed to;

determine whether the other, high wheel has a slip below a pre-determined threshold, if yes, select high, if no proceed to determine whether the high wheel has an acceleration above a predetermined threshold, if no, select low; if yes, proceed to determine whether the ratio of acceleration of the high to the low wheel is above a predetermined threshold, if no, select low; if yes, select high or modified select high mode In said second or subsequent cycle means may be provided to determine whether the high wheel slip is below a threshold a) if no, proceed to determine whether the low wheel slip is above a pre-determined threshold, if no, do not initiate a near $\mu$ test; if yes, proceed to determine whether the low wheel acceleration is below a predetermined threshold, if no, do not initiate a near $\mu$ test; if yes, proceed to determine whether the high wheel acceleration is above a predetermined threshold, if no, do not initiate a near $\mu$ test; if yes, proceed to determine whether the ratio or acceleration of the high friction wheel to the low friction wheel is above a pre-determined threshold, if no, do not initiate a near $\mu$ test; if yes, initiate a near $\mu$ test.

b) if yes proceed to, determine whether the low wheel slip is above a predetermined threshold, if no, do not initiate a near $\mu$ test; if yes, proceed to determine whether the low wheel acceleration is below a predetermined threshold, if no, do not initiate a near $\mu$ test; if yes, initiate a near $\mu$ test.

The means to perform a rise in brake pressure may be operable to cause said rise for a limited time period.

Said rise in brake pressure may be performed so as to cause said brake pressure to increase during the limited time period a) at a higher rate than in the previous pressure increase phase, or, optionally,
b) at the same rate as in the previous pressure increase phase, or
c) at a lower rate than in the previous pressure increase phase.

The means to control the brake pressure during the limited time period may be operable so that when the brake pressure is increased it is increased at the same rate, or at a faster rate, or at a slower rate than in the previous pressure increase phase.

Means may be provided to limit the brake pressure attained in the pressure increase phase, for example after the wheel engaged with the lower friction surface has met the conditions for anti-lock operation.

Said means to limit the brake pressure may end the pressure increase phase after a pre-determined time and then hold the brake pressure at that pressure.

The wheels may be steered wheels and/or driven wheels and/or non-steered, non-driven wheels.

The vehicle may have two axles namely a first axle and a second axle and each having a brake control channel for wheels on opposite sides of the axle.

When said first axle is operating in a high mode or in a modified high mode and the second axle is operating in a high mode or a modified high mode, a select high or low mode determination may be performed in respect of the first axle and set a select low flag if the first axle is to revert to low mode and a select high or low mode determination may be performed in respect of the second axle and reversion of the second axle to low mode may be conditional upon said select low flag having been set.

The vehicle may be a motor vehicle with a driven and a non-driven axle, or a semi-trailer having two or more axles or may be a full trailer having at least two axles.

The wheels of one axle may be a steerable wheels and the wheels of the other axle may be driveable.

Embodiments of the invention will now be described in more detail by way of example, with reference to the accompanying drawings:

BRIEF DESCRIPTION OF THE DRAWINGS

FIG. 4a is a graphical representation similar to that of FIG. 3 but showing a select high mode after initially selecting low mode;

FIG. 5 is a diagrammatic representation of the function of an algorithm for selection between a low mode and a high mode; and FIG. 6 is a diagrammatic representation of the function of an algorithm for selection between a low mode and a high mode where the vehicle has a second axle, FIG. 8 is a diagrammatic representation of the function of an algorithm for reverting from high to low, FIG. 9 is a diagrammatic representation of the function of an algorithm for reverting from modified high to low, and FIG. 10 is a diagrammatic representation of the function of an algorithm for reverting from multi axle high to low mode.

DESCRIPTION OF THE INVENTION

Referring now to the Figures.

Figure 1:
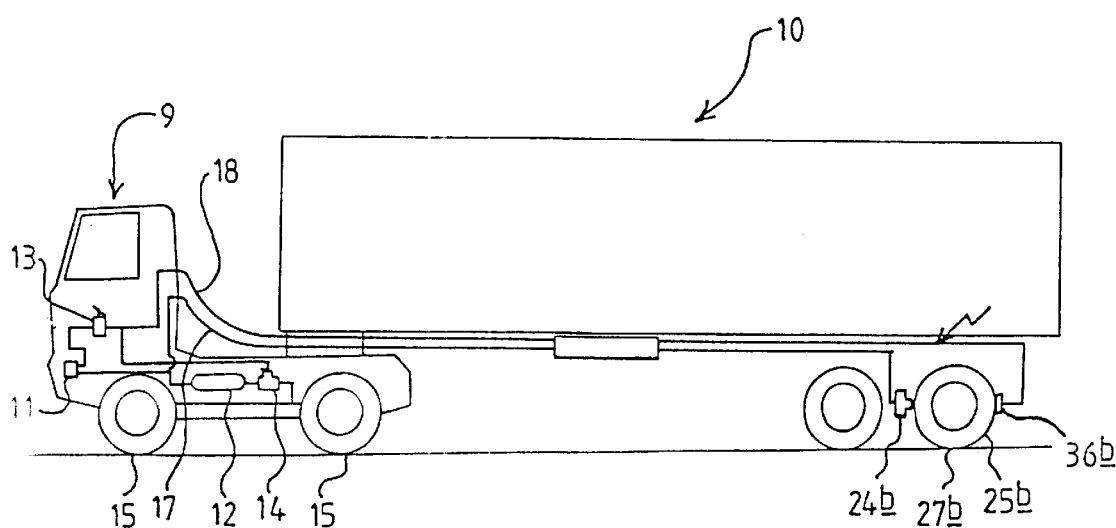
FIG. 1 is a diagrammatic illustration of a semi-trailer vehicle having an air braking system embodying the invention.

In FIG. 1 there is shown a tractor 9 to which a semi-trailer 10 is hitched by a conventional third wheel coupling in conventional manner. The tractor is provided with a conventional air brake system comprising an air compressor 11.

Figure 2:
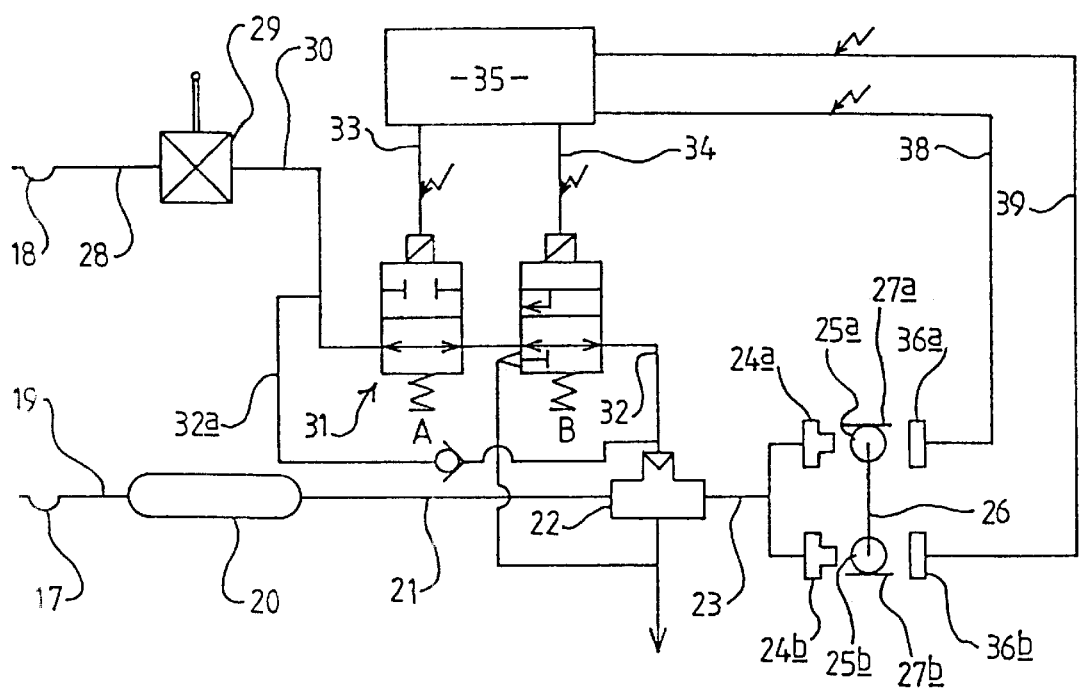
FIG. 2 is a circuit diagram showing the air braking system of the vehicle of FIG. 1.
Figure 2A:
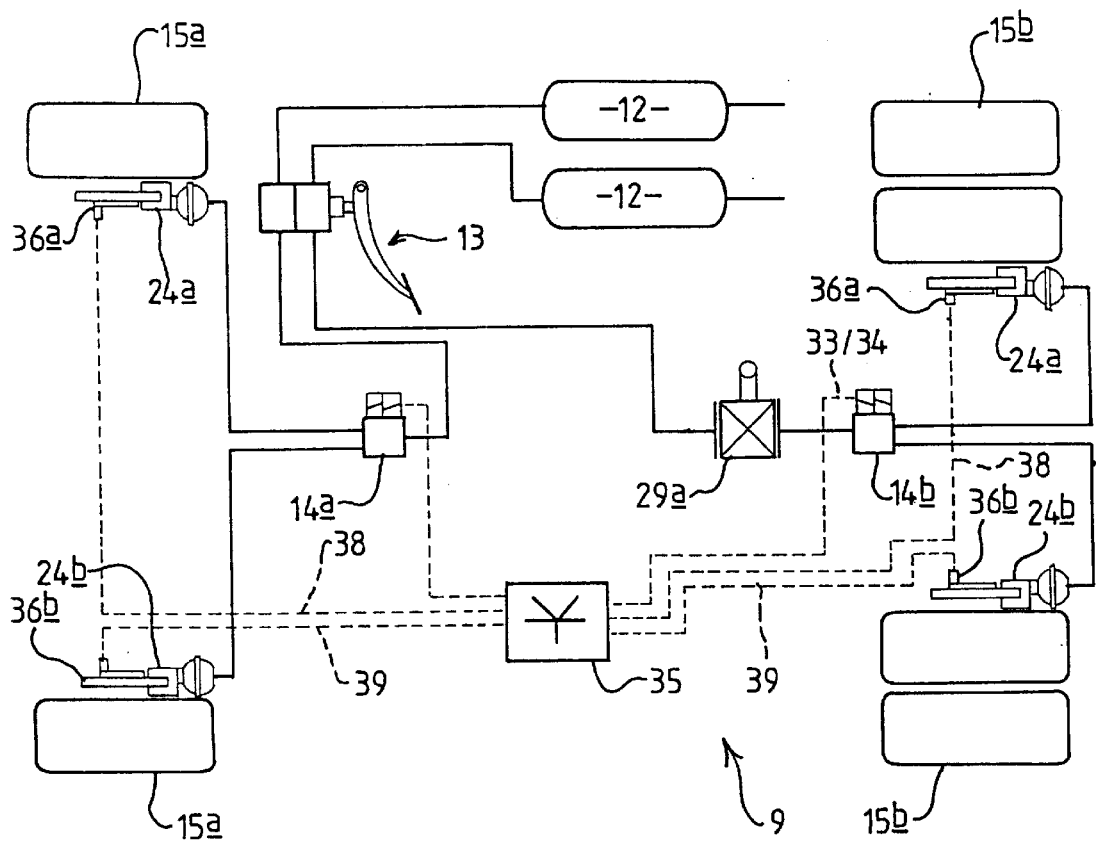
FIG. 2a is a circuit diagram showing an alternative air braking system for a powered and steered vehicle such as a tractor vehicle of the semi-trailer of FIG. 1, or a load carrying vehicle having driven and non-driven axles one of which is steerable.
Figure 2B:
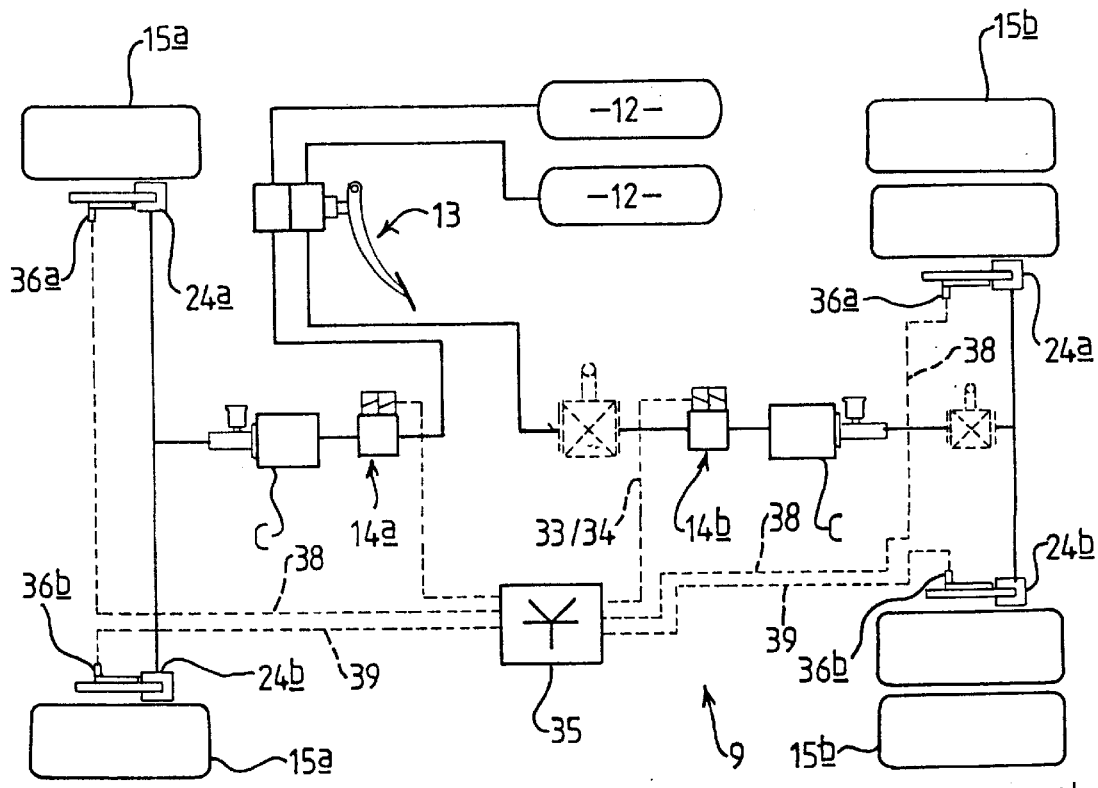
FIG. 2b is a circuit diagram showing another alternative braking system for a powered and steered vehicle having air/hydraulic braking system.

FIG. 2 shows an air braking system applied to the trailer 10, whilst FIG. 2a shows an air braking system applied to the tractor 9 and FIG. 2b shows a modification of FIG. 2a when the braking system is for the tractor 9 but relating to an air-hydraulic braking system. The same reference numerals are used in FIGS. 2 to 2b to refer to corresponding parts.

A reservoir means 12 is provided for storing compressed air, a driver operated foot brake command valve 13 which supplies a brake command signal to an in-line valve means 14 on the tractor which cause air or, as the case may be, hydraulic fluid to be supplied to brakes of the wheels 15 of the tractor. Referring to FIG. 2, a main air supply is provided to the trailer 10 via a conventional coupling 17 whilst a brake command signal from the pedal 13 is also supplied to the trailer 10 via a conventional coupling 18.

The main air supply via the coupling 17 is supplied via a line 19 on the trailer to a reservoir 20 and via line 21 to a relay valve 22 which provides a common supply valve to supply brake pressure via a line 23 to two wheel brakes 24a 24b for wheels 25a, 25h on opposite ends of an axle 26 of the trailer. The wheels 25a, 25b are engaged with surfaces 27a, 27b respectively. As the vehicle is driven the coefficient of friction of the surfaces may change in both absolute and relative terms.

The trailer has a single channel brake control system in which the brake command signal is fed via a line 28 to a load sensing valve 29 and via line 30 to a skid control means 31 which comprises two solenoid valves A, B. A one-way bi-pass line 32a may be provided between the line 32 and the line 30 to enable brake demand reduction even if the solenoid valves A, B are in a hold condition, hereinafter to be described. The valve A comprising a holding valve which, when energised, prevents flow of air in either direction through the valve whilst the valve B is an exhaust valve which, when energised, permits of exhaust of air via a line 32 connected to the control side of the relay valve 22.

The line 32 therefore provides a brake operating signal to the relay valve 22 which is dependent upon the brake command signal on the line 28 but modulated by the skid control means 31. The skid control means are controlled by skid control instructions provided on electrical lines 33, 34 extending from an electronic controller 35. The electronic controller 35 comprises a microcomputer which, in the present example, on a single chip provides a central processor unit (CPU) connected by an address bus and a data bus to a random access memory (RAM) serving as a working store and a programmable read only memory (PROM) serving as a store for an operating programme of the system, together with input and output ports for input and output of signals. If desired, these features of the electronic controller 35 may be realised in any other suitable manner, In FIG. 2a air is fed by a foot operable valve 13 to front, steerable, wheels 15a via an electrical modulating valve 14a and to rear, driven, wheels 15b via an electrical modulating valve 14b and a conventional load sensing valve 29a. The valves 14a, 14b are in-line valves so as to act directly on air to be supplied from the reservoir to the brakes 24a, b. The valves 14a, 14b, have two solenoids similar to the solenoids a and b described hereinbefore. If desired relay valves may be used in place of in-line valves and vice versa as appropriate throughout this specification, In FIG. 2b the system is additionally provided with pneumatic to hydraulic convertors C so that hydraulic fluid is supplied to the brakes 24a, b.

The PROM is programmed with an algorithm which provides a means to control the brake system of the present invention and to provide conventional ABS control and to adopt a high mode or a low mode, FIG. 5 illustrates the function of an algorithm in selecting between a low and a high mode where the invention is applied only to a single axle which may be of a trailer or a rear axle of a vehicle which may be a driven axle. FIG. 6 illustrates the function of the algorithm in selecting between a high mode and a low mode where the invention is applied, in addition, to a second axle which may be a steering axle.

The electronic controller is supplied with wheel speed signals on electrical lines 38, 39 from sensors 36a 36b which sense the speeds of the wheels 25a, 25b respectively.

Figure 3:
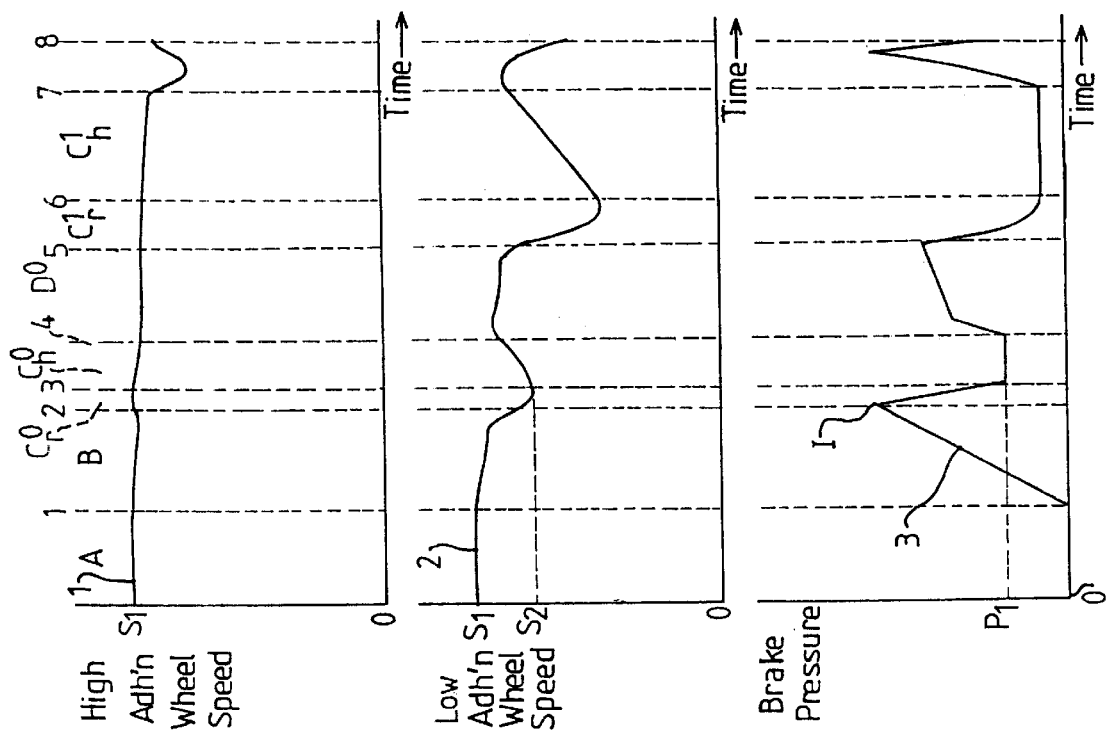
FIG. 3 is a graphical representation showing the variation of brake pressure with time and the corresponding variation of wheel speed with time for a wheel engaged with a high friction surface and a wheel engaged with a low friction surface in a braking system embodying the present invention showing a selected low mode.

For convenience of description, referring now to FIG. 3, an example of low control is illustrated. There is shown in the line marked 1 the speed of rotation, plotted against time, of one of the wheels 25a, 25b, whilst the line marked 2 similarly plots the speed of rotation of the other wheel. In the present example the lines marked 1 & 2 show the variation in speed of the wheel 25a and the wheel 25b respectively. In the present example, the wheel 25a is engaged with a surface having a co-efficient of friction which is higher than the co-efficient of friction of the surface with which the wheel 25b is engaged.

The line marked 3 plots the variation in brake pressure against time. The brake pressure is the pressure of the air in the line 23 which extends to the brakes 24a, 24b.

In the region A the driver has not demanded any braking with the valve 13 and therefore the brake pressure is zero and the wheels 25a, 25b are rotating at the same or similar speeds $S_1$, $S_1$ (corresponding to vehicle speed) which results from non-skidding engagement of the wheels 25a, 25b with surfaces 27a, 27b respectively. At point 1 the brakes are applied and in region B there is shown increase in brake pressure supplied to the brakes 24a, 24b in the line 23 as a result of the driver demanding brake application by depressing the foot valve 13 and hence providing a brake command signal via the connection 18 along line 28, load valve 29, line 30, skid control unit 31 and line 32 to the control side of the relay valve 22. At this stage the skid control unit 31 permits free flow of the brake command signal since, as can be seen from lines 1 and 2, initially the wheels are still rotating at a speed corresponding to vehicle speed since there is as yet no skidding, although the absolute value of the speed is somewhat decreased as a result of commencement of slowing of the vehicle.

At point 2 the wheel 25b is engaged with the surface 27b which has a coefficient of friction which is lower than that of the surface 27a by a relatively small amount and so the wheel 25b commences to skid relative to the surface 27b. In the present example the wheel does not stop rotating but it slows to a speed $S_2$.

As a result, in the present example of the sensor 36b detecting the onset of skidding of the wheel 25b the controller 35 sends skid control instructions to the solenoids A, B to perform an anti-skid cycle so as to energise the solenoid valves A and B to reduce the brake pressure during a pressure reduction phase C°r . until the brake pressure is reduced to a pressure $P_1$ at point 3 which is sufficient to stop the wheel skidding and allows it to recover to its normal rolling speed.

During a recovery phase C°h continues the anti-skid cycle and from point 3 to point 4, the pressure is held constant at pressure $P_1$, and the wheel 25b accelerates.

When the speed of the wheel 25b has recovered to within a predetermined level of vehicle speed (point 4), determined in known manner based on the memory of the vehicle speed prior to skidding, the controller 35 and supplies skid control instructions to the solenoid valves A, B so as to cause the brake pressure to rise from the level P1 in a predetermined regime, comprising an initial, relatively large step followed by a series of smaller steps separated by a holding phase, to a level which causes either another anti-skid cycle to start or maximum demand pressure is reached. The controller 35 initially provides a signal to the valves A and B so that they are both de-energised to cause a flow of brake command signal so that brake pressure is increased and then the solenoid A will be energised so as to hold the pressure for a predetermined time followed by de-energisation of the solenoid A to further increase the pressure so that the pressure is increased stepwise. In FIG. 3 the individual steps are not shown but the line 3 shows the "integrated" or time averaged effect of the steps. As shown in section D° the pressure is not increased stepwise at a constant rate but according to a predetermined regime. In the present example the first larger step i.e. steepest part of the line 3 in the region D°, depends upon the rate of acceleration, whilst the second part above the knee is, in the present example, constant, but other regimes may be used if desired. Other anti-skid cycles may be used in which, for example, the holding phase is very short or non existent.

Referring now to FIG. 5, when the brakes are first applied for example, at point I in FIG. 3 the controller is initially caused to enter a low/high mode decision process as illustrated in FIG. 5. That is to say initially in stage I the controller 35 senses, by virtue of speed signals provided on the sensors 36a, 36b whether a wheel i.e. the low friction wheel engaged with the lower friction surface, achieves predetermined deceleration and slip thresholds. If the thresholds are not met no anti-lock operation occurs.

When anti-lock operation is signalled in stage I the controller has means to determine in stage II whether the vehicle speed is above a minimum threshold speed. If it is not then control is given to the low friction wheel. If the minimum speed is above a minimum threshold a third stage of the algorithm is performed.

In the third stage deceleration of the low wheel determined in stage I is compared with a threshold deceleration, predetermined for stage III and if the low wheel has a deceleration below this value, control is select low.

Alternatively, if the qualification is met so that deceleration is above the predetermined threshold the algorithm proceeds to stage IV wherein the acceleration of the low wheel during the acceleration phase is compared with a pre-determined threshold. In fact, the time averaged acceleration for the wheel over the period concerned, e.g. 200 milli seconds, is determined. If the low wheel acceleration is not below the threshold the low wheel has control whilst if it is below the threshold the algorithm then proceeds to stage V where the extent of slip of the other wheel i.e. the high wheel is measured to ascertain whether it is below a pre-determined threshold. If the slip is below the threshold, control passes to the other i.e. high wheel so as to provide high or modified select high, as hereinafter to be described, control as shown in FIGS. 4a and 4b.

Alternatively, if the slip is not below the threshold the algorithm passes to stage VI which determines whether the acceleration of the high wheel is above a predetermined threshold. If the threshold is not above a pre-determined threshold control remains with the low wheel, whilst if it is above the pre-determined threshold, the algorithm passes to the stage VII where it is determined whether or not the ratio of the acceleration of the high wheel to the low wheel is above a threshold. If the acceleration ratio is not above the threshold control remains with the select low wheel, whilst if it is above the threshold the control passes to the select high wheel.

In high control, in which the brake system is controlled by the speed of rotation characteristics of the wheel engaged with the high friction surface and the air pressure is exhausted, held and increased in accordance with normal anti-skid control Modified high control mode is programmed at the controller because high control mode can lead to a tendency for a vehicle to pull or yaw to one side. This is due to the centre of effort of the brakes of the steerable wheels not being coincident with the centre of steering so that the differential braking effect can create a torque at the steering wheel which a driver has to try to counteract. This effect is particularly evident in respect of the steerable wheel of a driven vehicle such as the tractor of a semi trailer or a rigid load carrying lorry but may also be present on the front steerable wheels of a full trailer or an axle of a semi-trailer. In order to limit this effect modified high control is used.

Figure 4B:
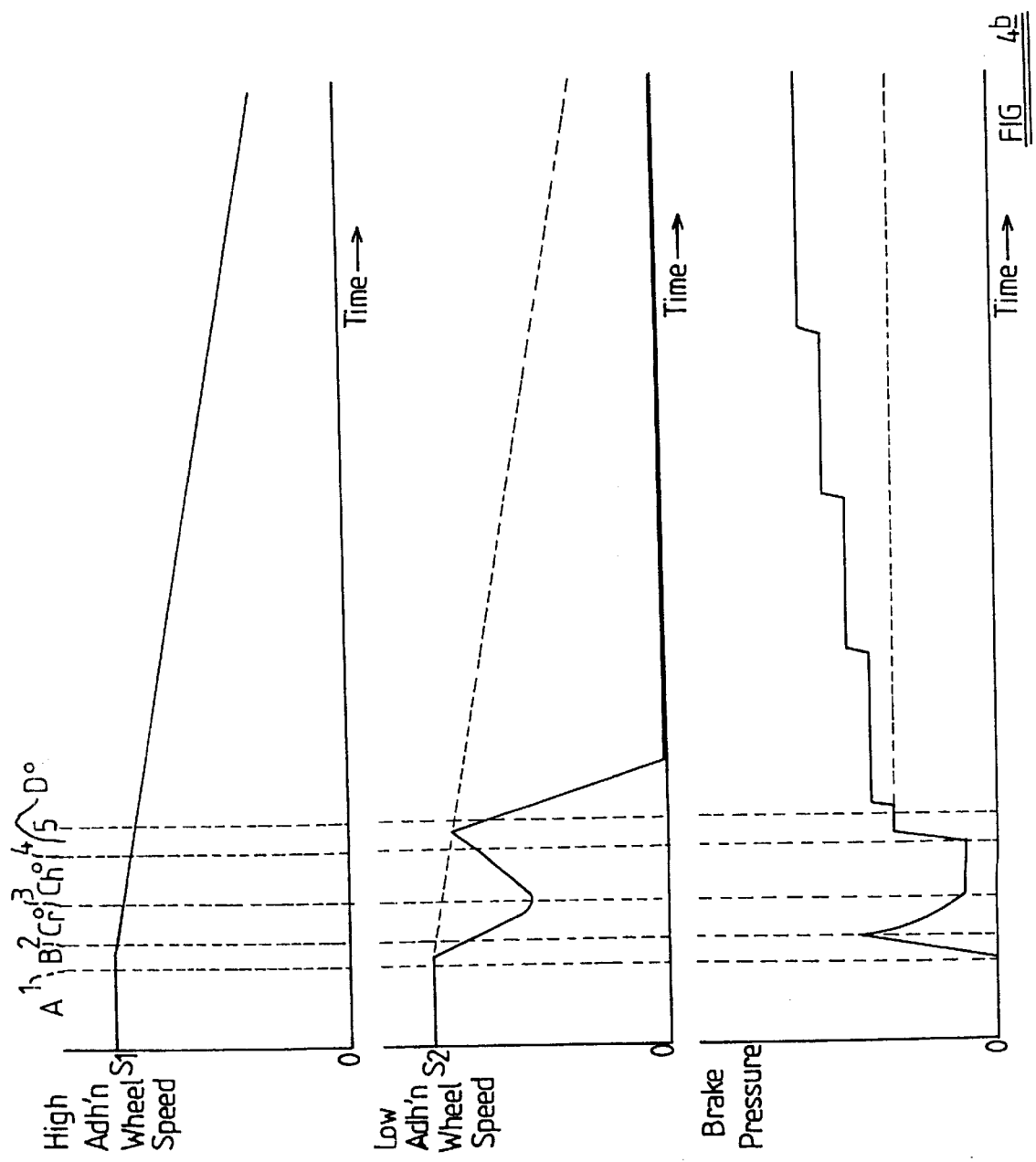
FIG. 4b is a graphical representation similar to that of FIG. 4a but showing a modified high mode after initially selecting low mode.

In modified high control mode means are provided whereby the controller delays increasing the brake pressure compared with normal or high control to the point of normal low or re-apply, i.e. point 4 in FIGS. 3 and 4. This difference is significant because the point of detection provides a datum i.e. point 5 at which instead of dropping the pressure as in low mode as in FIG. 3, it is held and stepped up as in high control, FIG. 4a, but less so as shown in FIG. 4b. The rate and magnitude of the pressure step up is vehicle dependent. As a result, normal high control utilises the available adhesion of the high adhesion wheel whilst modified high only partially utilises the available adhesion of the high adhesion wheel because of the above described differential braking forces.

In modified high the time period before pressure is re-applied is larger than the typically 200 milli second obtaining at the normal brake re-apply period for low control mode i.e. point 4, FIG. 3. The pressure increase is the same as for low mode up to point 5. Thereafter, unlike select low, in modified high control mode the pressure is held and then a control level pressure increase phase takes place. In modified high control mode the magnitude and rate of pressure increase is minimised to that necessary for the driver to be able to control yaw.

In a first cycle of anti-skid operation the system initially assumes the low friction wheel i.e. the first wheel to reach a deceleration threshold, is to control the system. Thus in each of FIGS. 3, 4a and 4b the sequences of wheel speeds and pressure are shown the same up to point 3. In fact the speed and deceleration of the wheels will vary depending on the frictional characteristics of the surfaces but these variations are not shown in the Figures.

After the brake pressure is held, at point 3, the low wheel accelerates and the determination described herein is performed to decide whether or not control is to remain low or change to high control made. The determination is done in a specific time, typically by the minimum necessary to be able to perform the determination which involves obtaining a measure of wheel acceleration, 200 milli seconds is typical.

If the means decides that control is to be low FIG. 3, reflects the position The low wheel accelerates and when it approaches vehicle speed, as suitable for the system concerned, the system starts to apply to axle brakes by providing and initial large pressure step followed by a plurality of smaller pressure steps until the wheel again starts to decelerate and attains a detection point 5 at which the air is again exhausted and a second cycle begins.

If the means decides that control is to be high, FIG. 4a reflects the position. In this case the brakes are applied after a predetermined time e.g. 200 milli seconds so as to minimise the time for which the high wheel is under-braked. In this case again an initial large pressure step occurs followed by a plurality of smaller pressure steps until the high friction wheel starts to decelerate and attains a detection point 5 at which the air is exhausted and a second cycle begins.

If the means is programmed for modified high control and decides to adopt that mode as a result of the above described determination whilst the wheel is accelerating, FIG. 4b reflects the position. In this case the system waits until the low friction wheel has approached vehicle speed, as suitable for the system concerned, and then the first pressure step is applied. The magnitude of this and the time may be chosen for the system concerned. This initial step causes the low function wheel to decelerate and attain the detection point 5 described with reference to FIG. 3. This detection point is used as a datum point for the friction characteristics of the surface with which the low wheel is engaged.

Thereafter, the brake pressure is increased in a controlled manner in a number of steps over a period of time and of a magnitude determined by the datum and/or the vehicle concerned until a predetermined pressure rise is achieved governed by the datum. This maximum pressure is limited compared with normal high mode as described herein.

Of course, in all cases, if, on pressure increase, there is no deceleration detection even at the maximum available brake pressure, anti-skid operation ceases.

Where the vehicle has two axles the algorithm is modified as shown in FIG. 6, where the same stages of the algorithm have been indicated with the same reference numerals as in FIG. 5.

Initially the algorithm takes signals from the axle and carries out stages I to IV as described in FIG. 5. Stage V differs in that if the high wheel slip is below the predetermined threshold then instead of passing directly to select high or modified select high the algorithm passes to stage VIII where in respect of the second axle it is determined whether or not the acceleration of the low wheel is below a pre-determined threshold. If yes, control passes to high or modified high control.

If the acceleration is not below the threshold, the algorithm proceeds to stage IX and a select high decision on the second axle is performed. The select high decision is the same as stages I to VII as described in connection with FIG. 5.

If the select high decision is yes select high or modified high control is provided whereas if it is no control remains with low mode.

Alternatively, if at stage V the high wheel slip is not below the threshold, the algorithm proceeds to stage VI and to stage VII as described in connection with FIG. 5. However if at stage VII it is determined that the acceleration ratio of the high to low wheel is above the threshold the algorithm again proceeds to stage VIII as described herein before and then either directly to modified select high to stage IX as previously described.

After the vehicle wheels have recovered to vehicle speed and braking continues, the pressure is increased in the region D° as previously explained. As the pressure increases, the wheel 25b, just before the line five in FIG. 3, engages with a portion of the surface 27b so the wheel 25b starts to skid at a higher brake pressure than that occurring at point 2. The algorithm is re-started but because this will be the second cycle of the anti-skid brake application a modified algorithm is used which is illustrated with reference to FIG. 7. This algorithm is designed to detect whether or not there is any change in the relative co-efficient of friction of the surfaces with which the wheels are engaged in order to ascertain whether the friction characteristics fulfil the requirements of the algorithm and hence whether or not a near 11 test should be applied.

Figure 7:
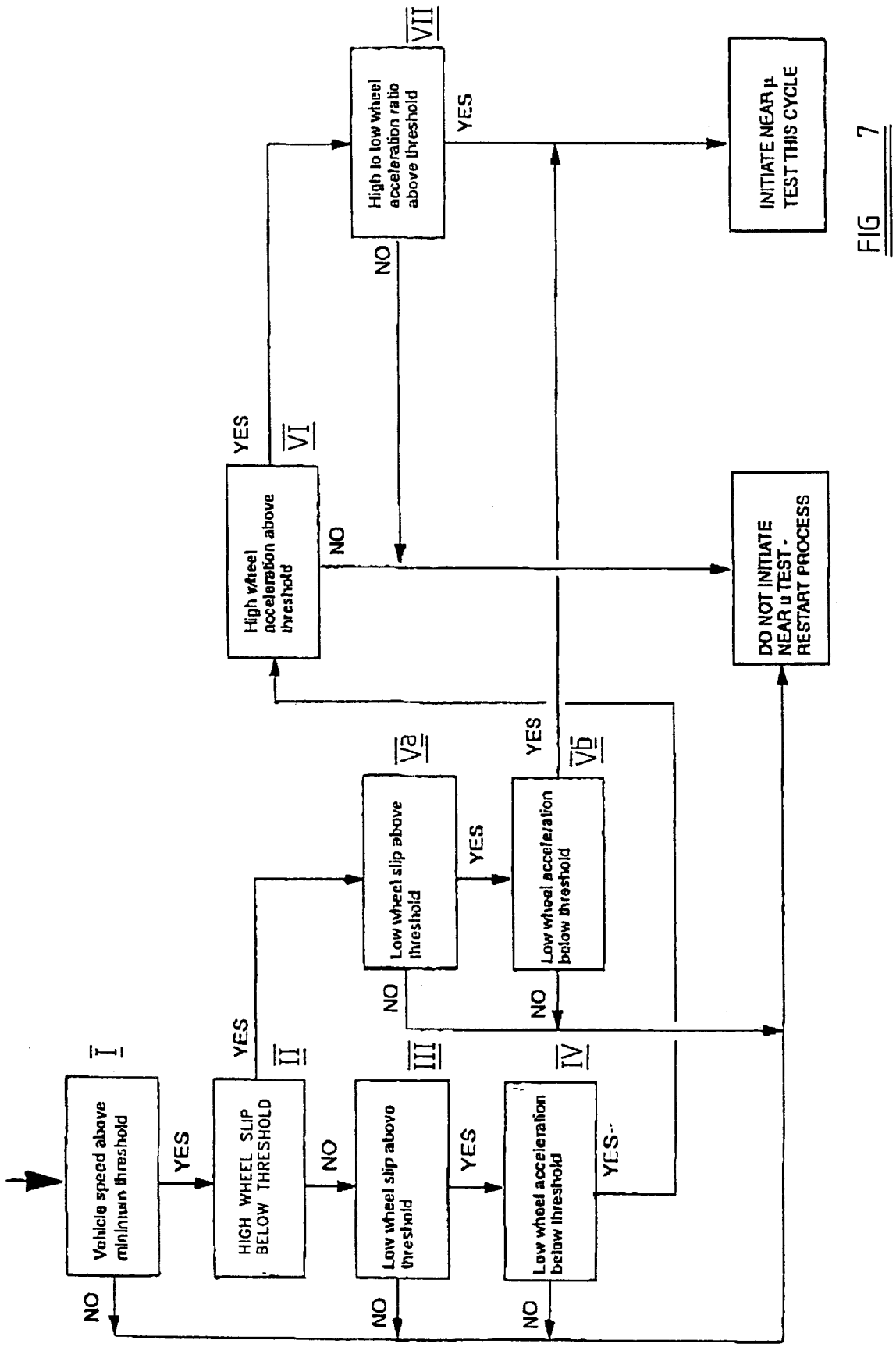
FIG. 7 is a diagrammatic representation of the function of an algorithm for determining whether there has been a change in surface friction.

In stage I of the algorithm, the vehicle speed relative to a minimum threshold is determined and the algorithm only passes to stage II if the vehicle speed is above the minimum threshold otherwise no near $\mu$ test is initiated and the algorithm of FIG. 7 is repeated.

In stage II it is determined whether the higher wheel slip is below a predetermined threshold. If the higher wheel is not below the threshold the algorithm passes to stage III.

In stage III it is determined whether the slip of the low wheel is above a pre determined threshold. If the low wheel slip is not above the threshold a near $\mu$ test is not initiated and the algorithm is repeated, whilst if it is above the threshold the algorithm passes to stage IV.

In stage IV it is determined whether the low wheel acceleration is below a predetermined threshold.

If the lower wheel acceleration is not below the threshold no near $\mu$ test is initiated and the algorithm is repeated whilst if it is above the threshold the algorithm passes to stage VI, where it is determined whether the high wheel acceleration is above a predetermined threshold.

If the high wheel acceleration is not above the threshold a near $\mu$ test is not initiated and the algorithm is repeated. If it is above the threshold the algorithm passes to stage VII.

In stage VII it is determined whether the ratio of high wheel to the low wheel acceleration is above a predetermined threshold.

If the acceleration ratio is above the threshold a near $\mu$ test is initiated for this cycle whereas if it is not above the threshold no near $\mu$ test is initiated and the algorithm is repeated.

If in stage II the high wheel slip is below the threshold the algorithm passes to stage Va where, if the low wheel slip is not above a threshold a near $\mu$ test is not initiated and the algorithm restarts. If the low wheel slip is above the threshold the algorithm passes to stage Vb where if the low wheel acceleration is not below a predetermined threshold no near $\mu$ test is initiated and the algorithm repeats. If the low wheel acceleration is below the threshold a near $\mu$ test is initiated.

In this second cycle the pressure is dropped in the region C1r and is held in the region C1h. Me near $\mu$ test is initiated at point 7.

This involves increasing the brake pressure more rapidly and above that which would normally take place, for a limited time period.

More particularly, the algorithm looks at the time T1, for which the solenoid A, FIG. 1, is deenergised to obtain the relatively large initial step of the pressure increase phase of the previous anti-skid cycle. Typically T is of the order of 20 to 30 milli seconds.

The algorithm stores a constant time Tc and this is added to the value of T to give the time T for which the solenoid A is operated so that the pressure is increased to provide the near $\mu$ "spike".

Alternatively, the algorithm: looks at the total time $T_T$ for which the solenoid A is de-energised and multiplies this by a stored function to give time T. Of course, at this stage both wheels will be again rotating but the control will start a third anti-skid brake application cycle at point 8. In this cycle, because a near $\mu$ test has been perform the algorithm reverts to that illustrated in FIG. 5 or, for a multi axle vehicle that illustrated in FIG. 6. Thereafter the same sequence is performed as described hereinbefore.

If, in any cycle subsequent to the first, it is determined that a near $\mu$ test should not be performed then the algorithm of FIG. 7 is repeated for each subsequent cycle until a near $\mu$ test is indicated to be initiated or of course, brake application is ceased.

Referring now to FIG. 8.

Where as a result of the initial cycle or any reversion to the initial cycle following a near $\mu$ test a high mode is operative the algorithm illustrated with reference to FIG. 8 takes place.

In stage I the algorithm determines whether the slip of the high wheel is below a threshold, if it is not below the threshold the algorithm progresses to stage II which determines whether the high wheel is accelerating above a pre-determined threshold. If the high wheel is not accelerating above a pre-determined threshold control reverts to low mode.

Alternatively, if in stage I the high wheel is passive or in stage II the high wheel is accelerating, above the predetermined threshold, in either case the algorithm passes to stage III which determines whether the low wheel is accelerating, If the low wheel is not accelerating control remains in high mode.

Alternatively if the low wheel is accelerating the algorithm passes to stage IV which determines whether the low wheel acceleration is above a threshold. If it is, control again reverts to low if it is not control remains in high.

If the vehicle is operating in modified high then instead of the algorithm in FIG. 8 being utilised the algorithm in FIG. 9 is utilised. In stage I it is determined whether the high friction wheel slip is less than a threshold. If it is not below the threshold, control reverts to select low If the high wheel is not below the threshold the algorithm progresses to stage II which determines whether the low wheel is accelerating. If the low wheel is not accelerating control remains in high mode. If it is accelerating then control reverts to low mode.

Where the vehicle has two axles, each axle having both wheels directly controlled and having independent modulation, the algorithm illustrated with reference to FIG. 10 is used.

In this algorithm the speed signals on axle 1 are used in stage I, This stage determines whether the low wheel is accelerating. If the low wheel is not accelerating the algorithm progresses to stage II which determines whether or not the high wheel is cycling i.e. under going an anti-skid cycle in which the wheel is slowing or stopping rotation and then increasing in speed. If the high wheel is not cycling control remains in modified high.

Alternatively if in stage II the low wheel is accelerating or in stage II the high wheel is cycling then the algorithm sets a select low flag in stage III and control reverts to low.

Axle 2 will be responsive to the speed signals from the wheels of axle 2 when axle 2 is operating in high mode. Since axle 2 will normally be behind axle 1 axle 2 will pass over the similar friction surfaces as axle 1 but slightly later.

Accordingly stage $I_2$ can check whether the select low flag of stage III has been set. If the flag has been set, control reverts to select low whereas if the flag as not been set control remains in select high.

This has the benefit of checking of decisions before entering high or modified high mode to help prevent a wrong decision being made. In addition, when modified high mode (MSLH) is used on the forward axle in conjunction with select high mode on a rear axle the small over pressure generated by the MSLH provides immediate indication of a surface change, i.e. cycling of the high wheel indicates change to low surface and recovery of the high wheel indicates change to high surface. Either of these conditions may be used to signal the rear axle to exit select high. This overcomes limitation of detecting split friction high friction transitions.

The speed, deceleration and acceleration threshold described herein vary between vehicle applications and may be determined empirically for the vehicle concerned.

If desired one or more steps of the algorithm described herein may be modified as necessary to achieve a desired effect.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

What is claimed is:

1. A vehicle braking system comprising:
   means, in an initial anti-skid cycle, to perform a first determination to select a high mode or a low control mode in accordance with wheel speed parameters;
   means in a second, or subsequent anti-skid cycle, to perform a second determination to determine whether a near $\mu$ test is to be performed in accordance with the wheel speed parameters;
   means, consequent upon selection of low mode to perform the near $\mu$ test, the near $\mu$ test comprising performing a rise in the brake pressure and then selecting a high mode or low mode in accordance with the speed of the wheels resulting from said rise in brake pressure in the near $\mu$ test.

2. A braking system according to claim 1 wherein said rise in brake pressure is a controlled rise.

3. A braking system according to claim 1 wherein, said selection of mode as a result of the near $\mu$ test comprises performing said first determination.

4. A braking system according to claim 1 wherein said selection of mode is performed in the first cycle following the near $\mu$ test and said second determination is performed in a following cycle or cycles.

5. A braking system according to claim 1 wherein in said first determination at least one of the following steps is performed:
   determine which wheel first achieves a pre-determined detection threshold, and nominate it the low wheel,
   determine the deceleration of low wheel,
   determine the acceleration of low wheel,
   determine the slip of the other, high, wheel,
   determine the acceleration of the other, high, wheel,
   determine the ratio of accelerations of said low and high wheel and select a high/modified high mode or a low mode in accordance therewith.

6. A braking system according to claim 1 wherein, where said first determination results in a low mode, in a subsequent anti-skid cycle, said second determination is performed.

7. A braking system according to claim 1 wherein in said second determination at least one of the following steps are performed:
   ascertain whether slip of said high wheel is below a threshold,
   determine the slip of the low wheel,
   determine the acceleration of the low wheel,
   determine the acceleration of the high wheel,
   determine the ratio of accelerations of the low and high wheels,
   determine whether or not a near $\mu$ test is to be performed in accordance therewith.

8. A braking system according to claim 1 wherein an anti-skid cycle comprises a cycle selected from the group comprising, a cycle in which the brake pressure is reduced, held constant and is then increased and a cycle in which the brake pressure is reduced and is then increased.

9. A braking system according to claim 1 wherein said anti-skid cycle comprises a cycle in which brake pressure is increased in steps by means comprising a solenoid which is intermittently de-energized and the system comprises means to,
   determine a time $T_1$ for which the solenoid is de-energized in a first step of the anti-skid cycle,
   and means to perform said near $\mu$ test by de-energizing said solenoid for a time $T=T_1+Tc$, where Tc is a constant.

10. A braking system according to claim 1 wherein anti-skid cycle comprises a cycle in which brake pressure is increased in steps by means comprising a solenoid (A) which is intermittently de-energized and the system comprises means to,
    determine the total time $T_T$ for which the solenoid is de-energized, in an initial step of the anti-skid cycle and all subsequent steps, and multiplying this by a function to give the time T.

11. A braking system according to claim 1 wherein said first determination comprises at least one of means to
    ascertain whether the low wheel has a deceleration which is above a pre-determined threshold, if no, select low mode; if yes, proceed to determine whether the low wheel has an acceleration which is below a predetermined threshold, if no, select low mode; if yes; proceed to determine whether the other, high wheel has a slip below a pre-determined threshold;

a) if yes, and the system has a single axle, select high mode; or, b) if yes, and the system has a second axle, proceed to; determine whether the low wheel of the second axle has an acceleration below a pre-determined threshold, if yes, select high mode or modified high mode;

if no, proceed to a select high decision on said second axle, if no; select low mode; if yes, select high or modified high mode.

c) if no, and the system has a single axle or a second axle, proceed to determine whether, the high wheel has an acceleration above a pre-determined threshold, if no, select low mode; if yes, proceed to determine whether the ratio of acceleration of the high to the low wheel is above a pre-determined threshold, c)₁ if no, select low mode;

if yes (and the system has a single axle) select high or modified high mode; or c)₂ if yes (and the system has a second axle) proceed to determine whether the low friction wheel of the second axle has an acceleration below a pre-determined threshold, if yes, select high mode or modified high mode; if no, proceed to effect a select high mode decision on a said second axle, if no, select low mode; if yes, select high mode or modified high mode.

12. A braking system according to claim 11 wherein the vehicle has a second axle and a select high decision on said second axle comprises at least one of means to ascertain which wheel first achieves a pre-determined detection threshold then nominate it the low wheel, determine whether the low wheel has deceleration which is above a pre-determined threshold, if no, select low mode; if yes, proceed to;

determined whether the low wheel has an acceleration which is below a predetermined threshold, if no, select low mode, if yes, proceed to;

determine whether the other, high wheel has a slip below a pre-determined threshold, if yes, select high mode; if no proceed to determine whether the high wheel has an acceleration above a pre-determined threshold, if no, select low mode; if yes, proceed to determine whether the ratio of acceleration of the high to the low wheel is above a pre-determined threshold, if no, select low mode; if yes, select high mode or modified select high mode.

13. A braking system according to claim 1 wherein in said second or subsequent cycle means is provided to determine whether the high wheel slip is below a threshold a) if no, proceed to determined whether the low wheel slip is above a pre-determined threshold, if no, do not initiate a near $\mu$ test; if yes, proceed to determine whether the low wheel acceleration is below a pre-determined threshold, if no, do not initiate a near $\mu$ test; if yes, proceed to determine whether the high wheel acceleration is above a pre-determined threshold, if no, do not initiate a near $\mu$ test; if yes, proceed to determine whether the ratio of acceleration of the high friction wheel to the low friction wheel is above a pre-determined threshold, if no, do not initiate a near $\mu$ test; if yes, initiate a near $\mu$ test.

b) if yes proceed to, determined whether the low wheel slip is above a pre-determined threshold, If no, do not initiate a near $\mu$ test; if yes, proceed to determine whether the low wheel acceleration is below a pre-determined threshold, If no, do not initiate a near $\mu$ test; if yes, initiate a near $\mu$ test.

14. A braking system according to claim 1 wherein said means to perform a rise in brake pressure is operable to cause said rise for a limited time period.

15. A braking system according to claim 14 wherein said rise in brake pressure is performed so as to cause said brake pressure to increase during the limited time period a) at a higher rate than in the previous pressure increase phase, or optionally, b) at the same rate as in the previous pressure increase phase, or c) at a lower rate than in the previous pressure increase phase.

16. A braking system according to claim 1 wherein the means to control the brake pressure during the limited time period is operable so that when the brake pressure is increased it is increased at the same rate, or at a faster rate, or at a slower rate than in the previous pressure increase phase.

17. A braking system according to claim 1 wherein means are provided to limit said rise in the brake pressure.

18. A braking system according to claim 17 wherein said means to limit the brake pressure ends the pressure increase phase after a pre-determined and then holds the brake pressure at that pressure.

19. A braking system according to claim 1 wherein the wheels are steered wheels and/or driven wheels and/or non-steered, non-driven wheels.

20. A braking system according to claim 1 wherein the vehicle has two axles namely a first axle and a second axle and each having a brake control channel for wheel on opposite sides of the axle.

21. A braking system according to claim 20 wherein, when said first axle is operable in a high mode or in a modified high mode and the second axle is operable in a high mode or a modified high mode, a select high mode or select low mode determination is performed in respect of the first axle and sets a select low mode flag if the first axle is to revert to low mode and a select high mode or select low mode determination is performed in respect of the second axle and reversion of the second axle to low mode is conditional upon said select low flag having been set.

22. A braking system according to claim 20 wherein the vehicle is a motor vehicle with a driven and a non-driven axle, or a semi-trailer having two or more axles or is a full trailer having at least two axles.

23. A braking system according to claim 1 wherein the wheel of one axle are steerable and the wheels of the other axle are driveable.

24. A vehicle braking system according to claim 1 wherein each of said means comprises a controller.

* * * * *